(No Model.)

J. S. DINKEL.
FRUIT CLIPPING AND HOLDING SHEARS.

No. 486,560. Patented Nov. 22, 1892.

Witnesses
J. Uhde M
Chas. B. Hyer

Inventor
James S. Dinkel.
By his Attorneys,
C. A. Snow & Co.

UNITED STATES PATENT OFFICE.

JAMES S. DINKEL, OF LONGWOOD, FLORIDA.

FRUIT CLIPPING AND HOLDING SHEARS.

SPECIFICATION forming part of Letters Patent No. 486,560, dated November 22, 1892.

Application filed May 19, 1892. Serial No. 433,579. (No model.)

*To all whom it may concern:*

Be it known that I, JAMES S. DINKEL, a citizen of the United States, residing at Longwood, in the county of Orange and State of Florida, have invented a new and useful Fruit Clipping and Holding Shears, of which the following is a specification.

This invention relates to a device for picking fruit or flowers which it is desirable to save as much as possible from bruising, and other work where it may be applicable, the object being to provide a simple, cheap, and easily-operated device by means of which the stem of the fruit may be clipped and held with its fruit and again smoothly reclipped next the fruit, thus severing the bruised portion of the stem held by the clipper-jaws and directly dropping the fruit therefrom into a basket or tray for its reception.

The invention consists in the construction and arrangement of the several parts, as hereinafter more fully set forth and claimed, whereby these beneficial results are accomplished, and the objectionable features of leaving the stem bruised, handling the fruit, using both hands in the work, and other inconveniences heretofore existing are overcome.

Figure 1:
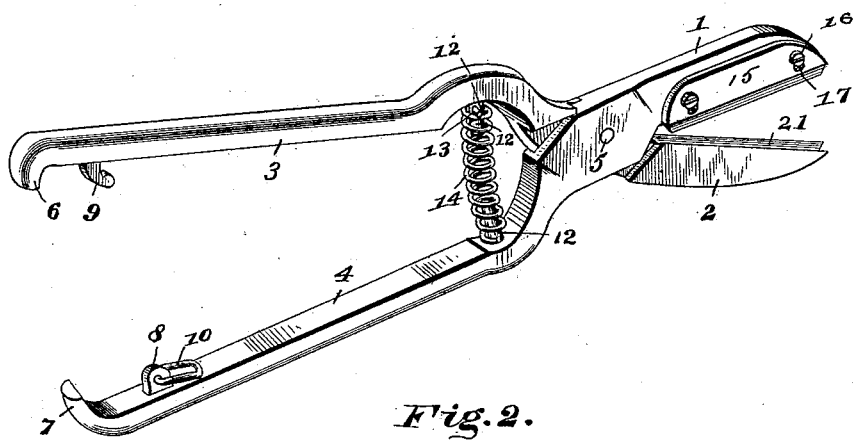
Figure 2:
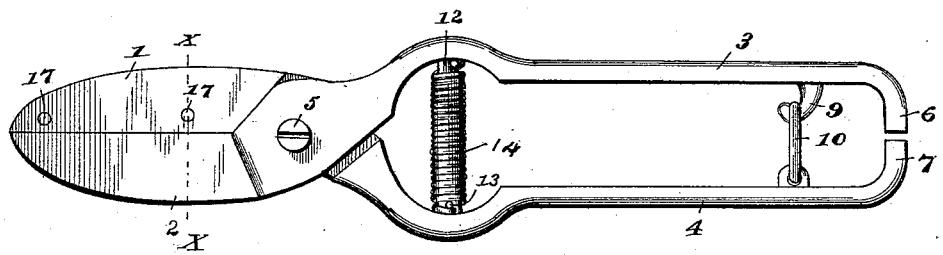
Figure 3:
Figure 4:
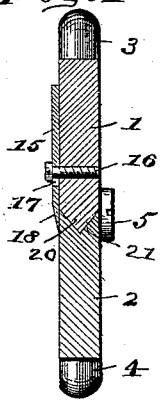

In the drawings, Figure 1 is a perspective view of the improved device. Fig. 2 is an elevation of the device, looking toward the side of the same opposite that shown in Fig. 1. Fig. 3 is a top plan view of the device. Fig. 4 is a transverse vertical section on the line *x x*, Fig. 2, and on an enlarged scale.

Similar numerals of reference indicate corresponding parts in the several views.

Referring to the drawings, the numerals 1 and 2 designate the jaws, having handles or operating-levers 3 and 4 shouldered and pivotally connected, as at 5, in the ordinary manner of pivoting scissors and shears. The rear ends of the handles or levers 3 and 4 are inwardly bent or extended, as at 6 and 7, and on the inner sides of the handles or levers, near the rear portions thereof, are formed an eye 8 and a hook 9, the eye 8 carrying a link 10, which is adapted to engage the hook 9, thereby locking the handles and jaws of the shears in closed position. The said handles or levers near the jaws are constructed with inwardly-projecting lugs 12, one of which has a stud or pin 13 projecting therefrom to take over one coil of a coiled spring 14, the opposite one of said lugs being in like manner provided with a stud or pin on the reverse side of the same, which has a similar function heretofore described, and by means of the spring set forth the jaws 1 and 2 are normally held open.

On the jaw 1 is adjustably and detachably secured a cutting-blade 15 by bolts or screws 16, which pass through transverse slots 17, formed in the said blade.

The upper cutting-edge 18 of the cutting-blade normally projects beyond the edge of the jaw 1 to provide a cutting or shearing action with the other jaw 2 before the opposing edges 1 and 2 come into holding contact or juxtaposition. The opposed jaws 1 and 2 are adapted to grip any object, whether it be a stem of fruit or flower or anything else adapted to be held by the device upon which they are closed. The meeting edges of the jaws may be variously formed to enable them to grip the object tightly, and they are preferably made to interlock. Jaw 1, as shown, has the upper edge thereof, as at 20, in the form of an angular ridge of V-shaped outline. The inner opposing edge of the jaw 2 is provided with a longitudinal groove 21, which is in like manner of V-shaped form, adapted to take over the edge 20 of the jaw 1. In lieu of this angular formation of the inner opposing jaws 1 and 2 they may be respectively formed convex and concave. In using the device the stem or stalk of a fruit or flower or a piece of wire or string is inclosed between the jaws and cut off by the cutting-edge of the blade 15 engaging the adjacent portion of the jaw 2, and after the manner of scissors or shears. The opposed jaws close upon the severed portion of the object directly it is cut off and prevent it from falling, as the end of the severed portion is tightly gripped by the projection or ridge of the lowered jaw 1, which presses it into the groove of the inner opposing edge of the jaw 2. Afterward the blade on the side of one of the jaws may be employed for reclipping the stem of a fruit or flower and remove the bruised portion thereof produced by the clamping effect of the inner opposing edges of the jaws thereon.

The advantages and convenience of this device are manifold, and the utility of the same will be readily apparent to those skilled in the art, and it is obvious that many minor changes in the construction of the parts might be made without in the least departing from the nature and spirit of the invention. The blade may be applied on either jaw and is normally adjusted so that the edge thereof extends beyond the inner edge of the jaw to which it is applied about the thickness of the stem to be cut or severed, and when the said blade becomes worn or sharpening of the same is necessary it can be removed at will. The edges of the V-shaped groove in jaw 2 form cutting-edges with the cutting-blade 15, as the latter may be applied to either side of either of the jaws, and the grooved and ridged construction of the opposing edges of said jaws may be reversed from positions shown in the accompanying drawings.

Having thus described the invention, what is claimed as new is—

The combination, with a pair of oppositely-pivoted jaws of equal thickness and adapted to grip an object, of a removable cutting-blade attached to one of the said jaws and adapted to be attached to the reverse side of the same jaw when the cutting-edge on the opposite jaw becomes blunted, substantially as described.

In testimony that I claim the foregoing as my own I have hereto affixed my signature in the presence of two witnesses.

JAMES S. DINKEL.

Witnesses:
  F. C. LEE,
  E. W. HENCK.